March 17, 1970  B. I. JOHANSSON  3,501,142

BICYCLE EXERCISER WITH CYCLICALLY VARYING RESISTANCE

Filed April 1, 1968

INVENTOR

BENGT INGVAR JOHANSSON

By Young + Thompson
ATTYS.

United States Patent Office 3,501,142
Patented Mar. 17, 1970

3,501,142
BICYCLE EXERCISER WITH CYCLICALLY VARYING RESISTANCE
Bengt Ingvar Johansson, Varberg, Sweden, assignor to Monark-Crescent Aktiebolag, Varberg, Sweden, a corporation of Sweden
Filed Apr. 1, 1968, Ser. No. 717,594
Claims priority, application Sweden, Dec. 4, 1967, 16,611/67
Int. Cl. A63b 23/04, 69/16, 21/00
U.S. Cl. 272—73                    2 Claims

ABSTRACT OF THE DISCLOSURE

A bicycle exerciser having a stand and pivoted in said stand a brake wheel and a pedal crank with pedals, said pedal crank being in driving engagement with said brake wheel to rotate it when said exerciser is pedaled by the user. In engagement with or adapted to be brought into engagement with said brake wheel is a brake band which may consist of a strip or friction material. An automatically cyclically varying braking force is applied to the brake wheel by way of a cam wheel being brought into and out of engagement with the brake band.

---

Figure 1:
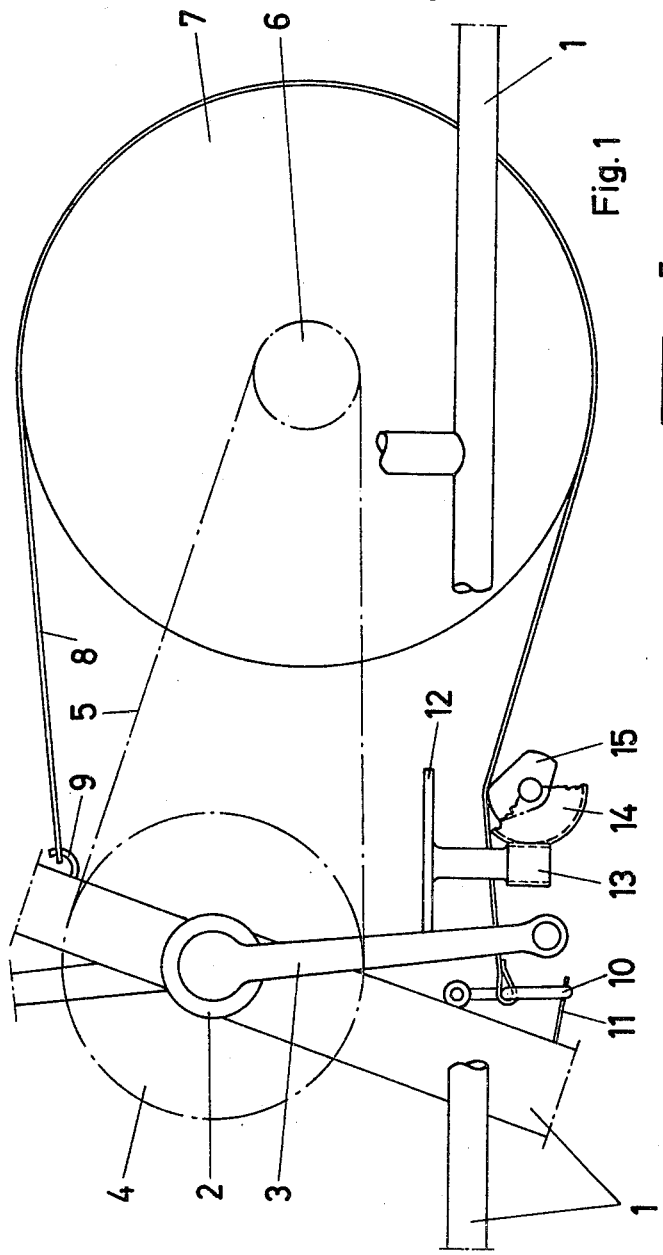

In general such exercisers are provided with a control device on the handlebar of the exerciser to set the desired brake effect which corresponds to the friction force between the brake member and the brake wheel. However, each such setting means only a fixed value of the brake effect and gives to the user no impression of cycling on a road with its varying degree of inclination.

It is an object of the present invention to provide means for an automatic and cyclical variation of said brake effect, thereby giving to the user of the exerciser an illusion of cycling on a road having different inclination conditions.

Further objects and advantages will become apparent from the drawing and the following description.

Figure 2:
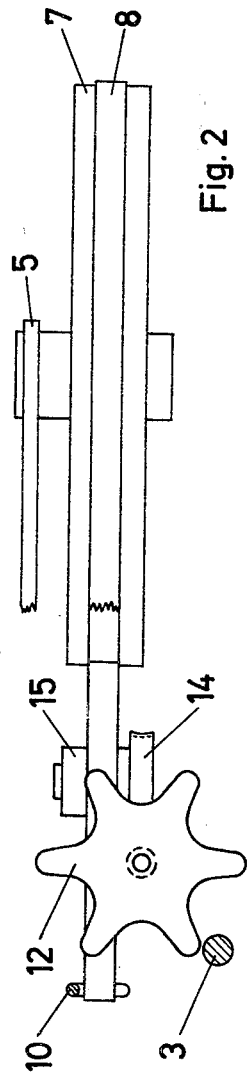

In the drawing:
FIGURE 1 is a side view of the exerciser according to the invention; and
FIGURE 2 is a plan view of the same exerciser.
Referring more in detail to the drawing:
1 designates the exerciser stand (only fragmentary disclosed) adapted to be placed on a floor. In this stand 1 there is a bearing 2 for a pedal crank 3 carrying in its outer ends pedals (not shown). To the pedal crank 3 there is fastened a chain wheel 4 which over a chain 5 drives a chain sprocket 6. This chain sprocket drives in a normal way a flywheel 7 pivoted in the stand 1 and corresponding to the rear wheel of an ordinary bicycle.

Around a great part of the periphery of the flywheel 7 is a brake strip 8, in its upper end fastened to a hook 9 in the stand 1. At its lower end the brake strip 8 is fastened to a tension lever 10 which over a wire is connected to a control device placed on the handlebar of the exerciser (the control device and the handlebar are not shown). By means of this control device the brake strip 8 can be tensioned more or less to increase or decrease the brake effect on the flywheel 7.

The device here above described is previously known.
According to the invention the stand 1 is provided with a vertical shaft (not shown), about which is pivoted a ratchet wheel 12 in engagement with the pedal crank 3. This ratchet wheel is in its lower end provided with a worm wheel 13, engaging a gear wheel 14 rotating about an horizontal shaft. The gear wheel 14 is provided with a cam wheel 15 engaging the brake strip 8 on the side opposite to the flywheel 7.

When pedaling the exerciser, thereby rotating the pedal crank and over the chain 5 also the flywheel 7, for every turn of the pedal crank the ratchet wheel 12 will be turned one step, thereby rotating the worm wheel 13, the gear wheel 14 and the cam wheel 15. This means that the latter one will press the brake strip 8 more or less upwards, so that it will be more or less tensioned and the brake effect will increase or decrease. This occurs automatically and cyclically when the exerciser is pedaled and gives to the user an illusion of cycling on a road having varying degree of inclination.

The cam wheel 15 can be shaped in different ways to produce the desired variation of the imaginary road inclination. It is also possible to have a series of wheels with different cams which wheels are interchangeable, thus enabling the use of a cam wheel with the desired degree of variation.

What I claim is:
1. In a bicycle exerciser having a stand and pivoted in said stand a brake wheel and a pedal crank with pedals, said pedal crank being in driving engagement with said brake wheel to rotate it when said exerciser is pedaled, a brake member in engagement with said brake wheel, and a control member adapted to be set in motion when said exerciser is pedaled and, during its motion, automatically and cyclically to vary the engagement force between said brake member and said brake wheel.

2. Exerciser as claimed in claim 1, wherein the brake wheel consists of a flywheel and the brake member of a brake strip engaging said flywheel, said pedal crank being in driving connection with a ratchet wheel which in turn is in driving connection with a cam wheel, said pedal crank thereby rotating said ratchet wheel and said cam wheel when said exerciser is pedaled, and an engagement between said cam wheel and said brake strip on a side thereof which is opposite to the flywheel, so that the rotation of the cam wheel brings about a varying tension of the brake strip and thus a variation of the brake effect.

References Cited

UNITED STATES PATENTS 2,872,191   2/1959   Gallo _____ 272—73

FOREIGN PATENTS

| 21,582 | 1905 | Great Britain. |
| 398,041 | 9/1933 | Great Britain. |
| 867,051 | 5/1961 | Great Britain. |
| 1,051,818 | 12/1966 | Great Britain. |

RICHARD C. PINKHAM, Primary Examiner

R. W. DIAZ, Assistant Examiner